United States Patent
Sakata et al.

(10) Patent No.: US 8,872,396 B2
(45) Date of Patent: Oct. 28, 2014

(54) ELECTRIC MOTOR AND ROTOR INCLUDING A PERMANENT MAGNET HOLDING MEMBER

(75) Inventors: Takatoshi Sakata, Yamatotakada (JP); Akihiko Kawano, Kashiwara (JP)

(73) Assignee: Jtekt Corporation, Osaka-Shi, Osaka (JP)

( * ) Notice: Subject to any disclaimer, the term of this patent is extended or adjusted under 35 U.S.C. 154(b) by 297 days.

(21) Appl. No.: 13/138,352

(22) PCT Filed: Feb. 8, 2010

(86) PCT No.: PCT/JP2010/051749
§ 371 (c)(1),
(2), (4) Date: Aug. 5, 2011

(87) PCT Pub. No.: WO2010/090303
PCT Pub. Date: Aug. 12, 2010

(65) Prior Publication Data
US 2011/0291498 A1 Dec. 1, 2011

(30) Foreign Application Priority Data

Feb. 9, 2009 (JP) ............................... P2009-026935
Oct. 14, 2009 (JP) ............................... P2009-236839

(51) Int. Cl.
*H02K 1/27* (2006.01)
*H02K 1/28* (2006.01)
*H02K 21/14* (2006.01)

(52) U.S. Cl.
CPC ..................................... *H02K 1/278* (2013.01)
USPC ................... 310/43; 310/156.13; 310/156.12; 310/156.23; 310/156.31; 310/271

(58) Field of Classification Search
USPC ..................... 310/43, 156.08, 156.09, 156.12, 310/156.13, 156.14, 156.19, 156.22, 310/156.23, 156.29, 156.31, 271
IPC ........................... H02K 21/12,21/14, 1/27, 1/28
See application file for complete search history.

(56) References Cited

U.S. PATENT DOCUMENTS 6,078,121 A * 6/2000 Poag et al. ................ 310/156.05
7,036,892 B2   5/2006 Suzuki et al.
(Continued)

FOREIGN PATENT DOCUMENTS

JP 64-45479 U 3/1989
JP 6-52376 A 2/1994
(Continued)

OTHER PUBLICATIONS

Machine translation of JP2004120916A (published Apr. 15, 2004, translated Jun. 4, 2013).*

*Primary Examiner* — Michael Andrews
(74) *Attorney, Agent, or Firm* — McGinn IP Law Group, PLLC

(57) ABSTRACT

A rotor of an electric motor is provided in which a permanent magnet holding member can be assuredly fixed to a rotor main body and the rotor main body can be easily worked and inexpensively manufactured. In the rotor, a plurality of permanent magnets 21 are held in a permanent magnet holding member 29 made of a synthetic resin and fixed to an outer peripheral part of a cylindrical rotor main body 28. An outer peripheral surface of the rotor main body 28 is a cylindrical surface. Rotation prevention recessed parts 30 are formed at a plurality of parts in the circumferential direction of the outer peripheral part in both end parts of the rotor main body 28. The permanent magnet holding member 29 includes annular parts 31 which come into close contact with the outer peripheral parts of both end faces of the rotor main body 28 and connecting parts 32 which connect both the annular parts 31 on the outer peripheral surface of the rotor main body 28 and hold the permanent magnets 21. A plurality of rotation prevention protruding parts 33 fitted to the rotation prevention recessed parts 30 of the rotor main body 28 are formed integrally with the permanent magnet holding member 29.

12 Claims, 6 Drawing Sheets

(56) References Cited

U.S. PATENT DOCUMENTS

| | | |
|---|---|---|
| 2005/0012387 A1 | 1/2005 | Suzuki et al. |
| 2007/0222326 A1* | 9/2007 | Ionel et al. .................. 310/43 |
| 2008/0048517 A1* | 2/2008 | Ochiai et al. ................ 310/218 |
| 2008/0174203 A1 | 7/2008 | Makino et al. |
| 2009/0001839 A1* | 1/2009 | Masayuki et al. ....... 310/156.16 |
| 2009/0284094 A1* | 11/2009 | Horng et al. ............. 310/156.22 |

FOREIGN PATENT DOCUMENTS

| | | | |
|---|---|---|---|
| JP | 9-19091 A | 1/1997 | |
| JP | 9-56094 A | 2/1997 | |
| JP | 11-243654 A | 9/1999 | |
| JP | 2000-166143 A | 6/2000 | |
| JP | 2001-268830 A | 9/2001 | |
| JP | 2004-120916 A | 4/2004 | |
| JP | 2004120916 A * | 4/2004 | ............... H02K 1/27 |
| JP | 2004-353536 A | 12/2004 | |
| JP | 2005-20887 A | 1/2005 | |
| JP | 2008-178229 A | 7/2008 | |
| JP | 2008-182786 A | 8/2008 | |
| JP | 2008-193847 A | 8/2008 | |
| WO | WO 2007/080888 A1 | 7/2007 | |

\* cited by examiner

ELECTRIC MOTOR AND ROTOR INCLUDING A PERMANENT MAGNET HOLDING MEMBER

TECHNICAL FIELD

The present invention relates to an electric motor and a rotor in an electric pump unit used as a hydraulic pump for supplying a hydraulic pressure to a transmission of, for instance, a motor vehicle.

BACKGROUND ART

To a transmission of a motor vehicle, a hydraulic pressure is supplied by a hydraulic pump. In a motor vehicle which carries out what is called an idle stop (an idling stop) that an engine is stopped during the stop of a vehicle in view of saving energy, an electric hydraulic pump is used to assuredly supply the hydraulic pressure to the transmission even during the idle stop.

Since the electric hydraulic pump for the motor vehicle is mounted on a restricted space of a vehicle body, compactness is requested, and further, lightness and a decrease of cost are also requested. In order to respond to such requests, an electric pump unit is proposed that has a pump, an electric motor for driving the pump and a controller of the electric motor attached to a common unit housing (for instance, see patent literature 1).

In the electric motor in this kind of electric pump unit, a DC brushless motor using a permanent magnet for a rotor is employed. In a usual DC brushless motor, a ring shaped or a segment shaped permanent magnet is fixed to an outer peripheral surface of a cylindrical rotor main body by an adhesive agent (for instance, see patent literature 2).

LITERATURE OF RELATED ART

Patent Literature

Patent Literature 1: JP-A-2004-353536
Patent Literature 2: JP-UM-A-6-52376

SUMMARY OF THE INVENTION

Problems that the Invention is to Solve

As described above, when the permanent magnet is fixed to the rotor main body by the adhesive agent, there is a fear that the adhesive agent may be peeled off in the motor used in a strict environment.

In order to avoid the permanent magnet from slipping out due to the peeling off of the adhesive agent, the segment shaped permanent magnet is supposed to be molded on the outer peripheral surface of the rotor main body by a synthetic resin or the segment shaped permanent magnet is supposed to be held by a permanent magnet holding member such as a holder made of a synthetic resin which is fixed to the outer peripheral part of the rotor main body. In that case, when a cross-sectional form of the rotor main body is circular, the synthetic resin slips in the circumferential direction due to a rotation, so that the permanent magnet holding member cannot be assuredly fixed. In order to prevent the slip of the synthetic resin, the cross sectional form of the rotor main body needs to be, for instance, non-circular or polygonal. Thus, the rotor main body is hardly worked. Further, the rotor main body needs to be manufactured so that opposed surfaces of the rotor have a highly accurate symmetrical feature. Thus, a cost is high.

In the case of the electric motor as well as the electric pump unit, the same problems arise.

It is an object of the present invention to solve the above-described problems and provide an electric motor and a rotor in which a permanent magnet holding member can be assuredly fixed to a rotor main body and the rotor main body can be easily worked and inexpensively manufactured.

Means for Solving the Problems

A rotor of an electric motor according to the present invention includes a cylindrical rotor main body, a permanent magnet holding member made of a synthetic resin and fixed to an outer peripheral part of the rotor main body and a plurality of permanent magnets held in the permanent magnet holding member, and is characterized in that an outer peripheral surface of the rotor main body is a cylindrical surface, rotation prevention recessed parts are formed at a plurality of parts in the circumferential direction of the outer peripheral part in both end parts of the rotor main body, the permanent magnet holding member includes annular parts which come into close contact with the outer peripheral parts of both end faces of the rotor main body and connecting parts which connect both the annular parts on the outer peripheral surface of the rotor main body and hold the permanent magnets and a plurality of rotation prevention protruding parts fitted to the rotation prevention recessed parts of the rotor main body are formed integrally with the permanent magnet holding member.

The permanent magnet holding member is formed integrally with the rotor main body by molding an outer peripheral part of the rotor main body with a synthetic resin by using, for instance, a die.

Since the rotation prevention protruding parts of the permanent magnet holding member are fitted to the rotation prevention recessed parts of the rotor main body, even when the outer peripheral surface of the rotor main body is generally formed in a cylindrical surface, the permanent magnet holding member does not slide in the circumferential direction relative to the rotor main body due to a rotation, so that the permanent magnet holding member is assuredly fixed. Since the outer peripheral surface of the rotor main body is the cylindrical surface, the rotor main body is easily worked and can be inexpensively manufactured.

The rotation prevention recessed parts formed in the rotor main body have, for instance, cut-out shapes extending from the end faces to the outer peripheral surface of the rotor main body. In this case, the rotation prevention protruding parts of the permanent magnet holding member are formed on surfaces of both the annular parts opposed to each other. The rotation prevention recessed parts may be formed in holes with bottoms which are provided at a plurality of parts of one of the end faces and the outer peripheral surface of the rotor main body or at a plurality of parts of both the end faces and the outer surface of the rotor main body. Further, the rotation prevention recessed parts are preferably formed in a plurality of parts which equally divide the outer peripheral part in the circumferential direction in both the end parts of the rotor main body. In any case, the rotation prevention protruding parts of the permanent magnet holding member are provided at positions corresponding to the rotation prevention recessed parts of the rotor main body.

In the rotor of the present invention, the connecting parts of the permanent magnet holding member include a plurality of rod shaped parts which extend in the axial direction and connect both the annular parts, permanent magnet holding pawl parts protruding to both sides in the circumferential direction are integrally formed in parts respectively extending outward in the radial direction from the annular parts of the rod shaped parts, and the permanent magnets are held between the pawl parts of the adjacent rod shaped parts.

In such a way, the permanent magnet holding member can be made to be light and the permanent magnets can be assuredly held by the pawl parts. The rod shaped parts are preferably formed in the same circumferential positions as those of the rotation prevention protruding parts.

In order to make an electric pump unit for a transmission more compact, a structure is supposed to be used that a pump and a electric motor for driving the pump are attached to a transmission housing and the electric motor is driven in oil introduced to the transmission housing for the purpose of making the electric motor compact and eliminating a seal by an oil cooling. In the structure that the electric motor is driven in the oil, a problem arises that a motor efficiency is deteriorated due to an oil agitation loss caused from the rotation of a rotor forming the electric motor.

In such a case, in the above-described rotor, for instance, outside diameters of the rod shaped parts having the pawl parts formed are more reduced as they go forward in the rotating direction of the rotor main body.

Thus, even when an electric motor is driven in the oil, the oil agitation loss due to the rotation of the rotor is low to suppress the deterioration of the motor efficiency.

For instance, the rotor main body is formed with a diameter enlarged part in which a diameter of a part of a motor shaft of the electric motor is enlarged.

For instance, the motor shaft of the electric motor is allowed to pass through a through hole formed in the rotor main body and fixed and key ways are provided in the through hole.

In such a case, the rotor main body may be formed with a sintered material separately from the motor shaft. Then, when the permanent magnet holding part is formed integrally with the outer peripheral part of the rotor main body, the key ways can be used for a phase alignment so that a die and a molding process may be simplified. Further, since the key ways are merely provided in the through hole formed in the rotor main body, the structure of the die is also simplified when the rotor main body is formed with the sintered material.

An electric motor according to the present invention includes the rotor according to the present invention.

Advantage of the Invention

According to the electric motor and the rotor of the present invention, as described above, the permanent magnet holding member can be assuredly fixed to the rotor main body and the rotor main body can be easily worked and inexpensively manufactured.

MODE FOR CARRYING OUT THE INVENTION

Figure 1:
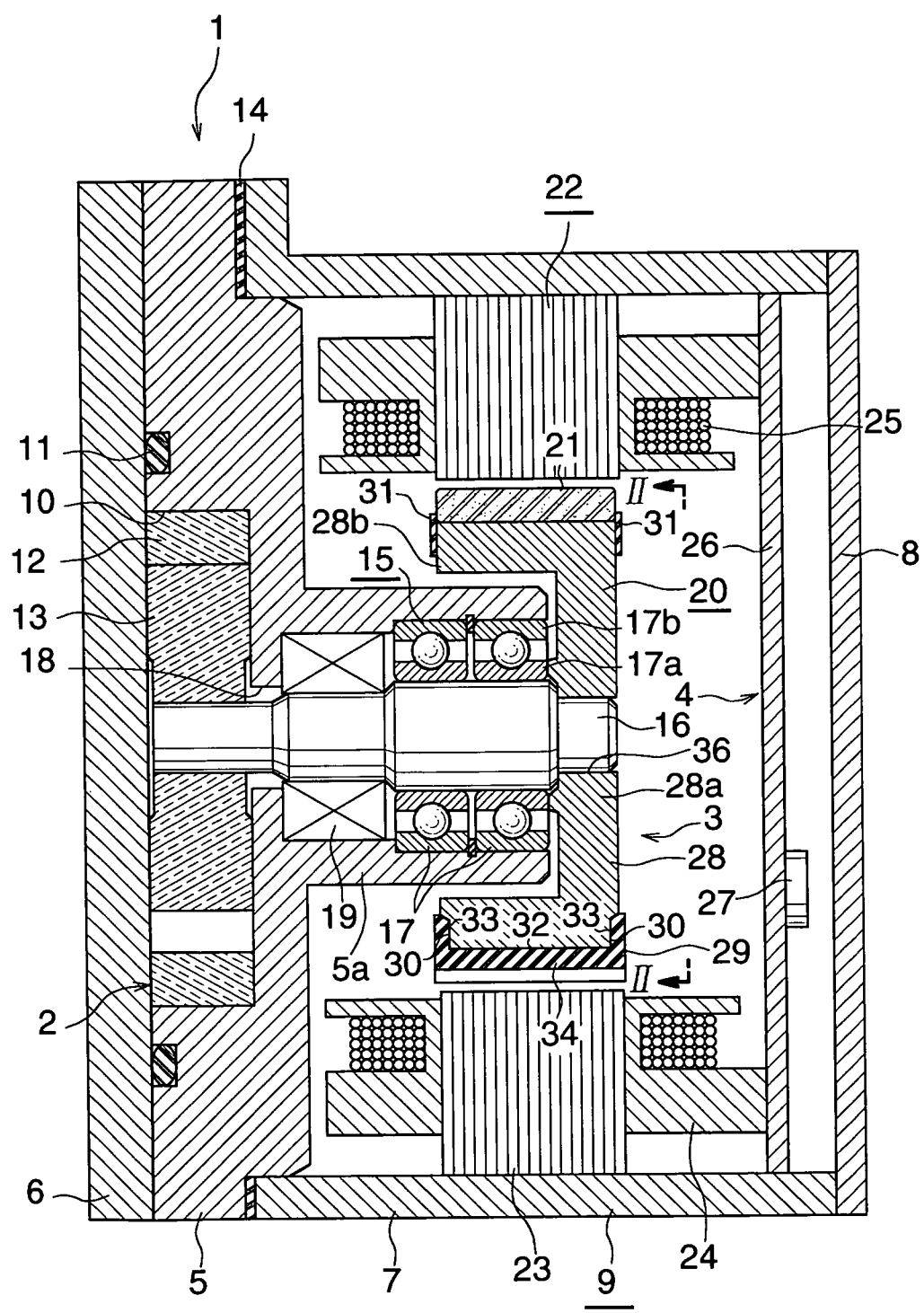
FIG. 1 is a longitudinally sectional view of an electric pump unit showing a first exemplary embodiment of the present invention.

Now, referring to the drawings, an exemplary embodiment will be described in which the present invention is applied to an electric motor in an electric pump unit used for a hydraulic pump of a motor vehicle.

FIG. 1 is a longitudinally sectional view of an electric pump unit showing a first exemplary embodiment of the present invention. In a below-described explanation, a left side of the drawing designates a front part and a right side of the drawing designates a rear part.

The electric pump unit has a pump (2) and an electric motor (3) that rotates and drives the pump (2) integrally attached to a unit housing (1). A controller (4) of the motor (3) is also attached to the housing (1). In this example, the pump (2) is a trochoid pump and the motor (3) is a DC brushless sensor-less motor having a three-phase winding.

The unit housing (1) includes a pump housing (5), a pump plate (6), a motor housing (7) and a cover (8). The pump housing (5), the motor housing (7) and the cover (8) form a waterproof housing (9).

The pump housing (5) has a thick plate shape with an extension in the direction orthogonal to a forward and rearward direction and a pump chamber (10) whose front part is opened is formed in a central part of the pump housing (5). To a front surface of the pump housing (5), the pump plate (6) is fixed through an O ring (11) to close a front surface of the pump chamber (10). In the pump chamber (10), an outer gear (12) forming the pump (2) is accommodated so as to freely rotate. An inner gear (13) engaged with the outer gear is arranged inside the outer gear (12). In the pump plate (6), an oil inlet and an oil outlet, illustrations of which are omitted, are provided.

The motor housing (7) has a cylindrical shape and a front end thereof is fixed to a part near to an outer periphery of a rear surface of the pump housing (5) through a seal (14). A rear end opening of the motor housing (7) is closed by the cover (8).

In a center of a rear end surface of the pump housing (5), a cylindrical part (5a) having a diameter smaller than that of the motor housing (7) is integrally formed and a pump driving motor shaft (16) which is extended in a forward and rearward direction is cantilever supported by a bearing device (15) provided in a rear part of the cylindrical part (5a). In this example, the bearing device (15) is formed with two ball bearings (17) of rolling bearings adjacent in front and rear parts. An inner ring (17a) of each bearing (17) is fixed to the motor shaft (16) and an outer ring (17b) is fixed to the cylindrical part (5a). A front part of the motor shaft (16) passes through a part of a hole (18) formed in a rear wall of the pump housing (5) to enter the pump chamber (10) and an front end thereof is connected to the inner gear (13). A seal (19) is provided between a part of a front side from the bearing device (15) in the cylindrical part (5a) and the motor shaft (16).

To a rear end part of the motor shaft (16) protruding rearward from the cylindrical part (5a), a motor rotor (20) forming the motor (3) is fixed. The rotor (20) is a cylindrical member which is extended in the radial direction from the rear end of the motor shaft (16) to surround an outer periphery of the bearing device (15). A permanent magnet (21) is fixed to an outer periphery of the rotor. A position of the axial direction of a center of gravity of a rotating part including the motor shaft (16), the rotor (20) and the inner gear (13) of the pump (2) is located within a range of the axial direction of the bearing device (15). In this example, the position of the axial direction of the center of gravity is located between the two ball bearings (17) forming the bearing device (15).

To an inner periphery of the motor housing (7) opposed to the rotor (20), a motor stator (22) forming the motor (3) is formed to be fixed. In the stator (22), an insulator (an insulating member made of a synthetic resin) (24) is attached to a core (23) formed with a laminated steel plate, and a coil (25) is wound on a part of the insulator (24). In this example, the stator (22) is fixed to the inner periphery of the motor housing (7) by a suitable unit such as an adhesion in the outer periphery of the core (23).

To a rear end of the insulator (24), a base board (26) of the controller (4) is fixed. To the base board (26), a parts (27) forming the controller (4) is fixed. The parts is arranged at a prescribed position of at least one of a front surface and a rear surface of the base board (26). In the drawing, one parts (27) is shown which is attached to the rear surface of the base board (26).

Figure 2:
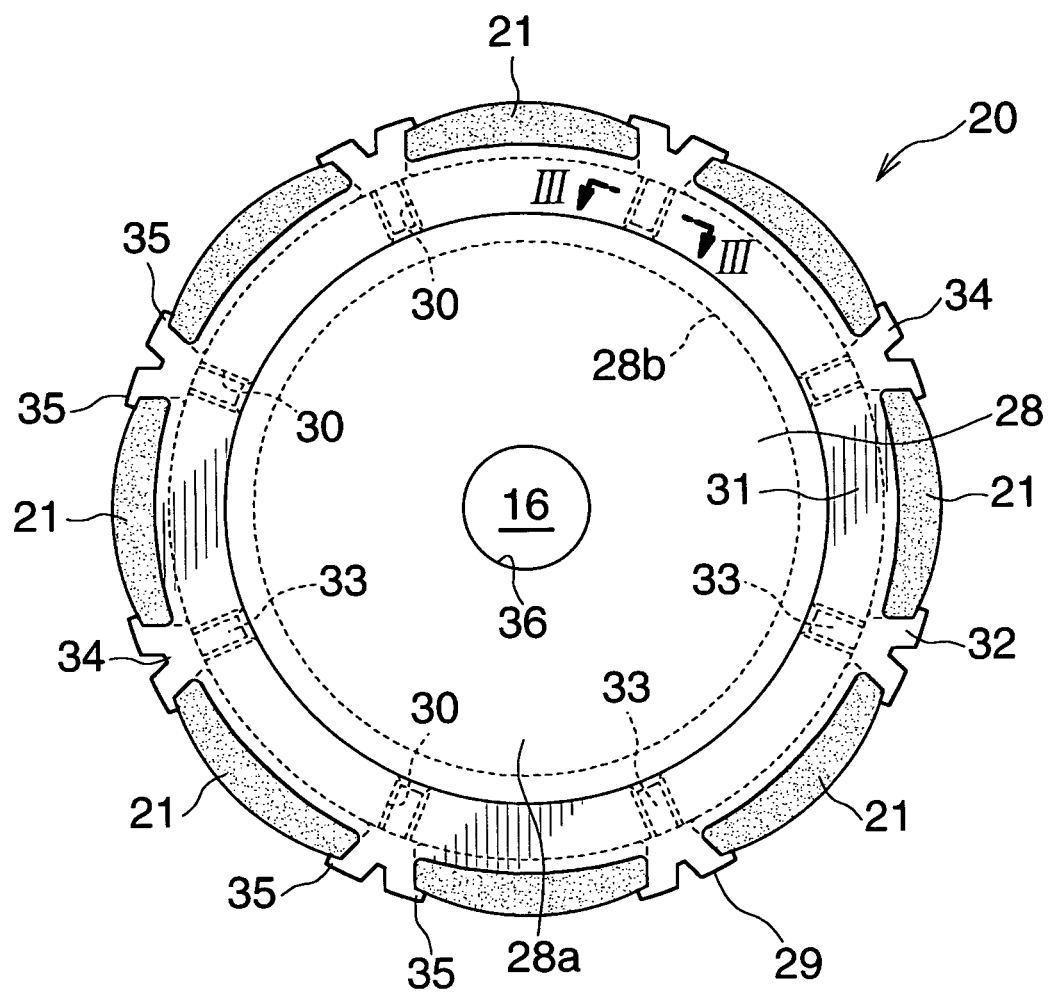
FIG. 2 is an enlarged sectional view taken along a line II-II in FIG. 1.
Figure 3:
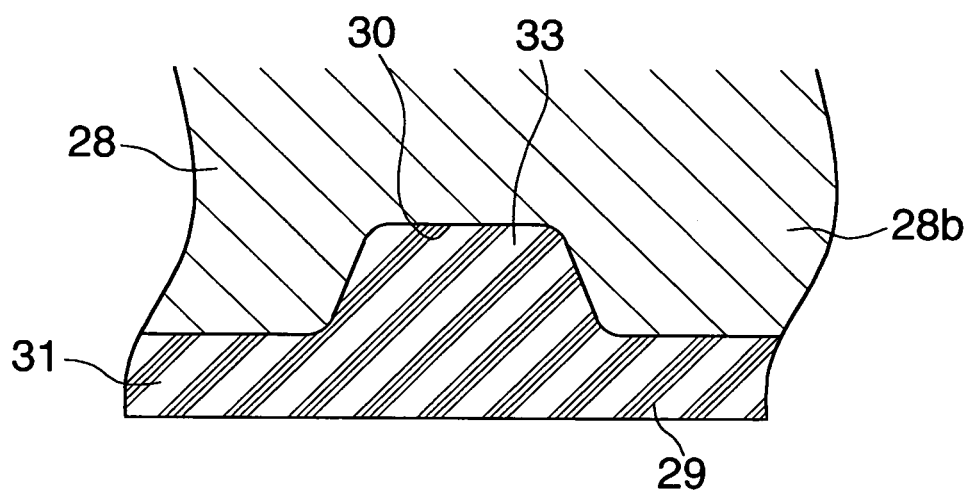
FIG. 3 is an enlarged sectional view taken along a line in FIG. 2.
Figure 4:
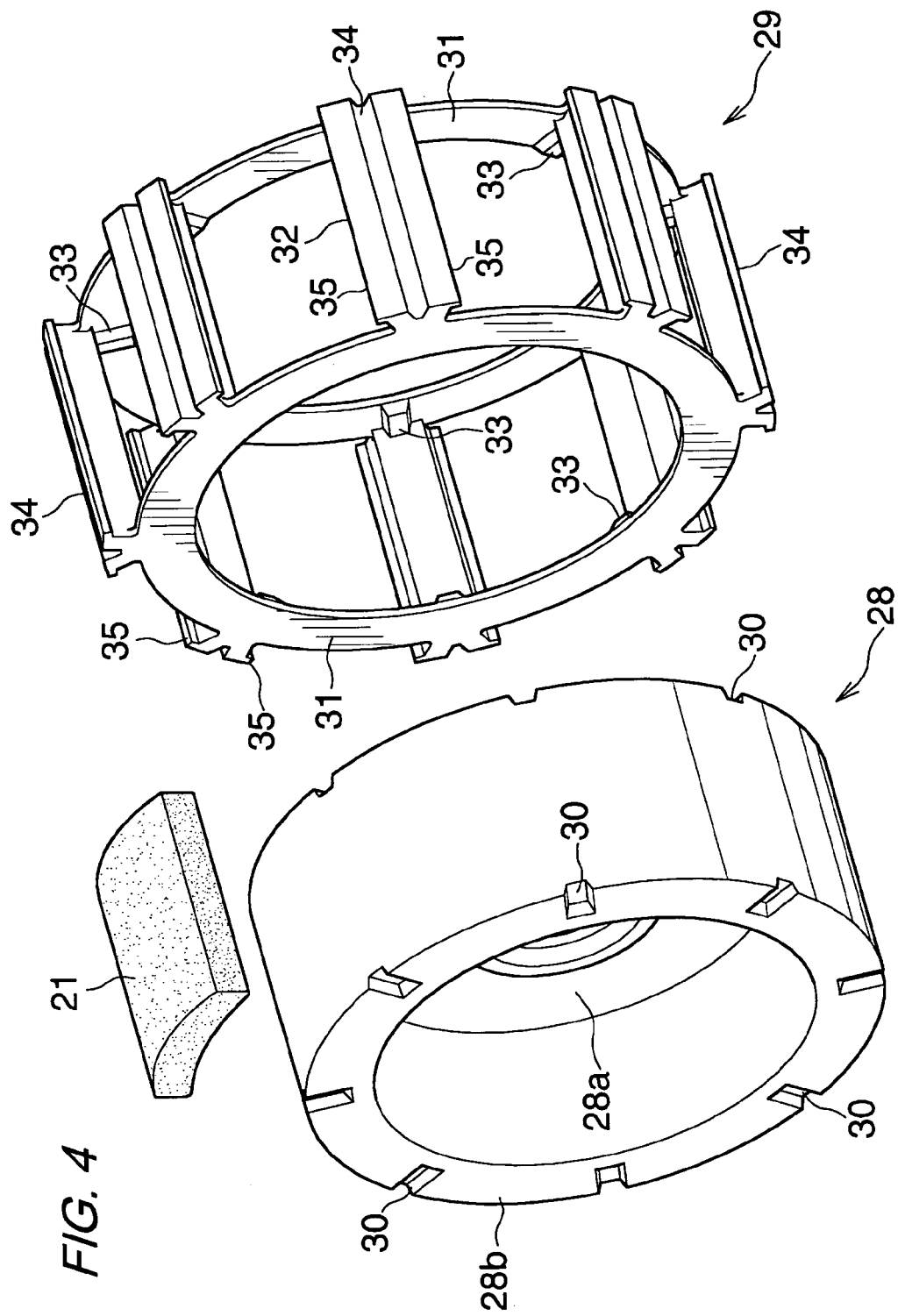
FIG. 4 is a virtual exploded perspective view of a rotor of an electric motor.

FIG. 2 to FIG. 4 show a detail of the rotor (20). FIG. 2 is an enlarged sectional view taken along a line II-II in FIG. 1. FIG. 3 is an enlarged sectional view taken along a line III-III in FIG. 2. FIG. 4 is a virtual exploded perspective view of the rotor (20).

In the rotor (20), on an outer periphery of a cylindrical rotor main body (a back yoke) (28), a permanent magnet holding member (29) made of a synthetic resin is provided to be fixed. In a plurality of parts (eight in this example) that equally divide the holding member (29) in the circumferential direction, segment shaped permanent magnets (21) are held.

The rotor main body (28) is formed by, for instance, a sintering and includes a flange part (28a) fixed to the motor shaft (16) and a cylindrical part (28b) integrally formed in an outer peripheral end of the flange part (28a) and extended forward so as to surround the outer periphery of the bearing device (15). The motor shaft (16) is pressed-in to a circular through hole (36) formed in the flange part (28a) and fixed. An outer peripheral surface of the cylindrical part (28b) is generally formed in a cylindrical surface and the cross sectional form of the outer peripheral surface is circular. In a plurality of parts (eight in this example) which equally divide the outer peripheral parts at both end parts of the cylindrical part (28b), rotation prevention recessed parts (30) are formed. In this example, the recessed parts (30) are formed in outermost peripheral parts of both the end faces of the cylindrical part (28b) and are cut-out parts extending from outer peripheral parts of the end faces of the cylindrical part (28b) to the end parts of the outer peripheral surface.

The holding member (29) is formed integrally with the cylindrical part (28b) by molding the outer peripheral part of the cylindrical part (28b) with a synthetic resin by using a die. The holding member (29) includes annular parts (31) which come into close contact with the outer peripheral parts of both the end faces of the cylindrical part (28b) and connecting parts (32) which connect both the annular parts (31) and hold the permanent magnets (21) on the outer peripheral surface of the cylindrical part (28b). On opposed surfaces of both the annular parts (31) to each other, a plurality of rotation prevention protruding parts (33) are integrally formed which are fitted to the recessed parts (30) of the cylindrical part (28b). The connecting parts (32) include a plurality of rod shaped parts (34) extending in the axial direction to connect both the annular parts (31). The rod shaped parts (34) are formed at a plurality of parts (eight in this example) which equally divide the annular parts (31) in the circumferential direction and at the same circumferential positions as those of the protruding parts (33). The rod shaped parts (34) include V shaped parts in cross sections extending outward in the radial direction from the annular parts (31). In end parts of both sides of the parts, permanent magnet holding pawl parts (35) are integrally formed which protrude to both sides in the circumferential direction. Then, the permanent magnets (21) are inserted and held between the pawl parts (35) of the adjacent rod shaped parts (34) from the axial direction.

Since the holding member (29) is formed integrally with the rotor main body (28), both the members are not separated from each other, however, in order to easily understand the structures of both the members, FIG. 4 is shown as an exploded perspective view in which both the members are separated from each other.

The rotation prevention recessed parts formed in the cylindrical part (28b) of the rotor main body 28 are not the cut-out shaped recessed parts (30) extending from the end faces to the outer peripheral surface of the cylindrical part (28b) as described above, and the rotation prevention recessed parts may be holes with bottoms formed in a plurality of parts of one of the end faces and the outer peripheral surface or both the end faces and the outer peripheral surface of the cylindrical part (28b). In that case, the rotation prevention protruding parts of the holding member (29) are provided at positions corresponding to recessed parts as the holes having bottoms. When the rotor main body is formed with a sintered member, since the holes are hardly worked, the cut-out shaped recessed parts (30) as described above are preferable.

In the above-described motor (3) and the rotor (20) thereof, since the rotation prevention protruding parts (33) of the permanent magnet holding member (29) are fitted to the rotation prevention recessed parts (30) of the rotor main body (28), even when the outer peripheral surface of the rotor main body (29) is generally formed in a cylindrical surface and the cross sectional form of the outer peripheral surface is circular, the permanent magnet holding member (29) does not slide in the circumferential direction relative to the rotor main body (28) due to a rotation, so that the permanent magnet holding member (29) is assuredly fixed. Since the outer peripheral surface of the rotor main body (28) is the cylindrical surface, the rotor main body is easily worked and can be inexpensively manufactured.

In the above-described electric pump unit, since one part of the motor shaft (16) in the axial direction is cantilever supported by the bearing device (15) and the motor rotor (20) is provided so as to surround the outer periphery of the bearing device (15), the length of the motor shaft (16) may be shortened to make the electric pump unit more compact. Further, since the position of the axial direction of the center of gravity of the rotating part including the motor shaft (16), the motor rotor (20) and the inner gear (13) of the pump (2) is located within the range of the axial direction of the bearing device (15), the rotating part can be stably rotated and supported. Further, since the position of the axial direction of the center of gravity is located between the two ball bearings (17) forming the bearing device (15), the rotating part can be more stably rotated and supported. Further, the bearing device (15) can be supported only by the cylindrical part (5a) formed integrally with the pump housing (5) and other members for supporting the bearing device (15) are not required. Accordingly, the number of parts can be more reduced and a weight can be decreased and a cost can be more lowered.

Figure 5:
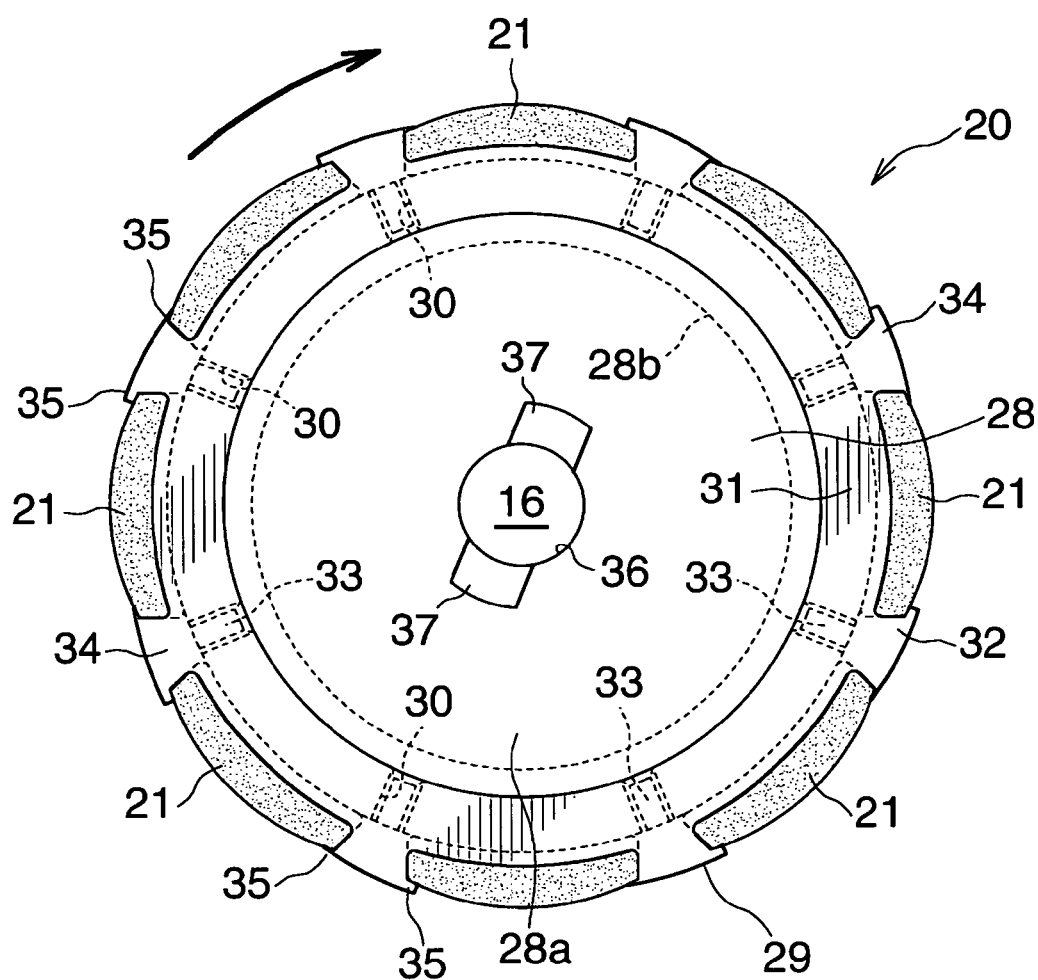
FIG. 5 is a view showing a second exemplary embodiment of the present invention and corresponding to FIG. 2.

FIG. 5 is a view (a rear view of a rotor (20)) corresponding to FIG. 2 which shows a second exemplary embodiment of the present invention. In FIG. 5, parts corresponding to those shown in FIG. 2 are designated by the same reference numerals.

In the case of the second exemplary embodiment, at least one key way (37) is formed in a through hole (36) of a flange part (28a) of a rotor main body. In this example, two key ways (37) are formed at two symmetrical positions of the hole (36). Further, outer peripheries of rod shaped parts (34) of a permanent magnet holding member (29) having pawl parts (35) formed have cylindrical forms. An outside diameter of each rod shaped part (34) is more reduced as it goes forward in the rotating direction of the rotor main body (28). In this case, a motor shaft (16) is pressed-in to the hole (36) to be fixed.

Other structures are the same as those of the first exemplary embodiment.

In the second exemplary embodiment, since the outside diameters of the rod shaped parts (34) are more reduced as they go forward in the rotating direction of the rotor main body (28), even when an electric motor (3) is driven in oil, an oil agitation loss due to the rotation of a rotor (20) is low to suppress the deterioration of a motor efficiency. When the permanent magnet holding member (29) is formed integrally with the outer peripheral part of the rotor main body (28), the key ways (37) of the hole (36) can be used for a phase alignment so that a die and a molding process may be simplified. Further, since the key ways (37) are merely provided in the through hole (36) formed in the rotor main body (28), the structure of a die is also simplified when the rotor main body (28) is formed with a sintered material.

Figure 6:
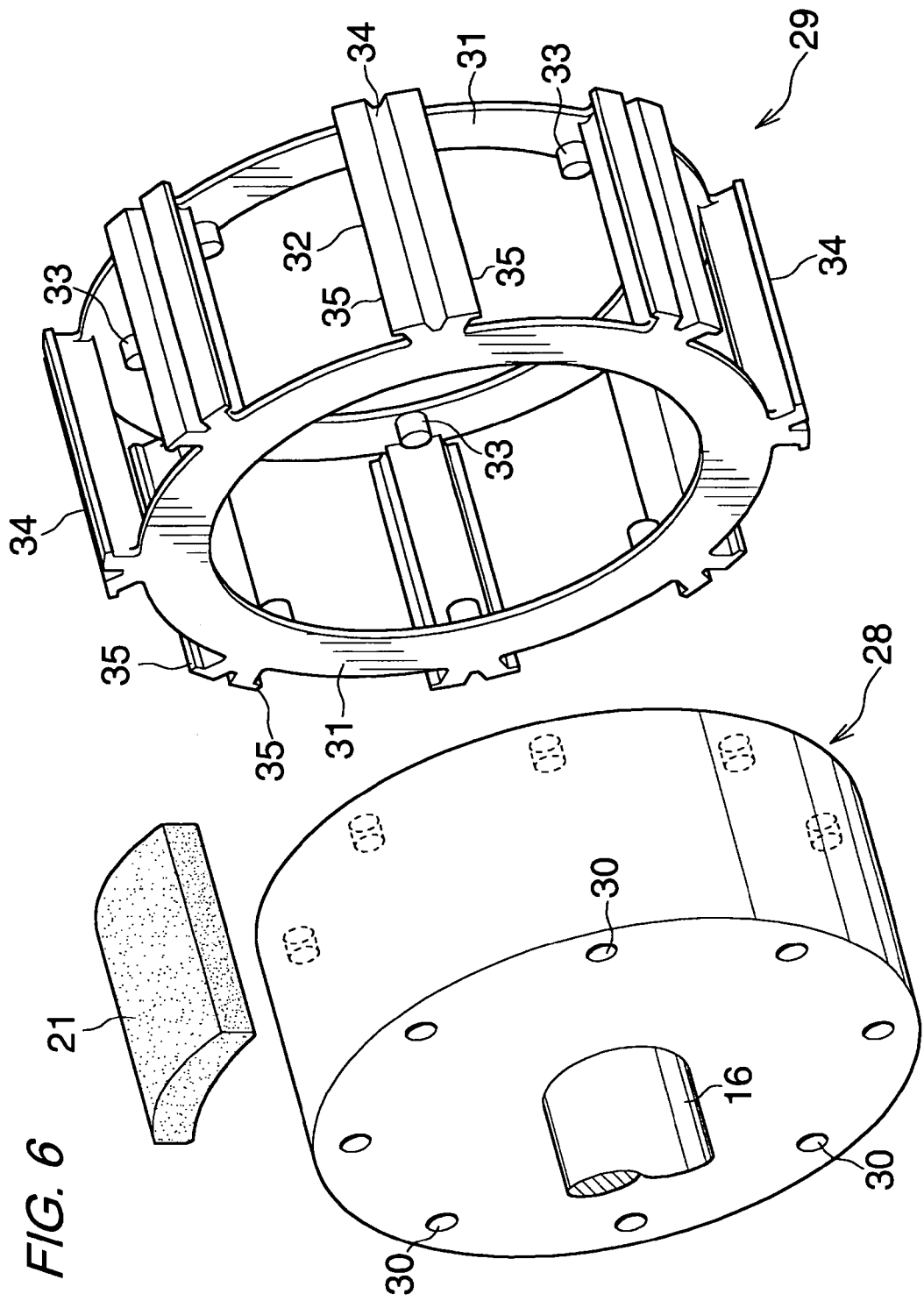
FIG. 6 is a virtual exploded perspective view of a rotor of an electric motor showing a third exemplary embodiment of the present invention.

FIG. 6 is a view (a virtual exploded perspective view of a rotor (20)) corresponding to FIG. 4 which shows a third exemplary embodiment of the present invention. In FIG. 6, parts corresponding to those shown in FIG. 4 are designated by the same reference numerals.

In the case of the third exemplary embodiment, a rotor main body (28) is formed integrally with a motor shaft (16). A diameter enlarged part formed in a part of the motor shaft 16 is the rotor main body (28). Rotation prevention recessed parts (30) formed on outer peripheral parts of both end faces of the rotor main body (28) are circular holes with bottoms. Rotation prevention protruding parts (33) formed on annular parts (31) of a permanent magnet holding part (29) correspondingly thereto are protrusions having circular forms in section. In this case, two parts of the motor shaft (16) are rotated and supported by a bearing device not shown in the drawing.

Other structures are the same as those of the first exemplary embodiment.

The entire structure and the structures of parts of the electric pump unit are not respectively limited to those of the above-described embodiments and may be suitably changed.

For instance, in the above-described embodiments, the bearing device is formed with the rolling bearings, however, the bearing device may be formed with slide bearings.

Further, the present invention may be applied to other electric motor than the electric motor in the electric pump unit for the motor vehicle.

DESCRIPTION OF REFERENCE NUMERALS AND SIGNS (3) electric motor (20) rotor (21) permanent magnet (28) rotor main body (29) permanent magnet holding member (30) rotation prevention recessed part (31) annular part (32) connecting part (33) rotation prevention protruding part (34) rod shaped part (35) permanent magnet holding pawl part (36) through hole (37) key way

The invention claimed is:

1. A rotor for an electric motor comprising:
   a cylindrical rotor main body;
   a permanent magnet holding member made of a synthetic resin and fixed to an outer peripheral part of the rotor main body; and
   a plurality of permanent magnets held in the permanent magnet holding member,
   wherein an outer peripheral surface of the rotor main body comprises a cylindrical surface,
   wherein rotation prevention recessed parts are formed at a plurality of parts in a circumferential direction of the outer peripheral part in both end parts of the rotor main body,
   wherein the permanent magnet holding member includes annular parts which come into close contact with the outer peripheral parts of both end faces of the rotor main body and connecting parts which connect both the annular parts on the outer peripheral surface of the rotor main body and hold the permanent magnets,
   wherein a plurality of rotation prevention protruding parts fitted to the rotation prevention recessed parts of the rotor main body are formed integrally with the permanent magnet holding member,
   wherein the connecting parts of the permanent magnet holding member include a plurality of rod shaped parts which extend in an axial direction and connect both the annular parts, permanent magnet holding pawl parts protruding to both sides in the circumferential direction are integrally formed in parts respectively extending outward in a radial direction from the annular parts of the rod shaped parts, and the permanent magnets are held between the pawl parts of the adjacent rod shaped parts, and
   wherein the rod shaped parts are formed in the same circumferential positions as those of the rotation prevention protruding parts.

2. A rotor according to claim 1, wherein the permanent magnet holding member is formed integrally with the rotor main body by molding the outer peripheral part of the rotor main body with a synthetic resin by using a die.

3. A rotor according to claim 1, wherein outside diameters of the rod shaped parts having the pawl parts formed are more reduced as they go forward in a rotating direction of the rotor main body.

4. A rotor according to claim 1, wherein the rotation prevention recessed parts are formed in cut-out shapes extending from the end faces to the outer peripheral surface of the rotor main body.

5. A rotor according to claim 1, wherein the rotation prevention recessed parts are formed in holes with bottoms in the end faces of the rotor main body.

6. A rotor according to claim 1, wherein the rotation prevention recessed parts are formed in a plurality of parts which equally divide the outer peripheral part in the circumferential direction in both the end parts of the rotor main body.

7. A rotor according to claim 1, wherein the rotor main body is formed with a diameter enlarged part in which a diameter of a part of a motor shaft of the electric motor is enlarged.

8. A rotor according to claim 1, wherein the motor shaft of the electric motor is allowed to pass through a through hole formed in the rotor main body and fixed and key ways are provided in the through hole.

9. An electric motor including the rotor according to claim 1.

10. A rotor according to claim 1, wherein the rod shaped parts include V-shaped parts, in a cross sectional view, extending outward in the radial direction from the annular parts.

11. A rotor according to claim 1, wherein the connecting parts are formed such that adjacent permanent magnets are separated by the connecting parts.

12. A rotor for an electric motor comprising:
- a cylindrical rotor main body;
- a permanent magnet holding member made of a synthetic resin and fixed to an outer peripheral part of the rotor main body; and
- a plurality of permanent magnets held in the permanent magnet holding member,
- wherein an outer peripheral surface of the rotor main body comprises a cylindrical surface,
- wherein rotation prevention recessed parts are formed at a plurality of parts in a circumferential direction of the outer peripheral part in both end parts of the rotor main body,
- wherein the permanent magnet holding member includes annular parts which come into close contact with the outer peripheral parts of both end faces of the rotor main body and connecting parts which connect both the annular parts on the outer peripheral surface of the rotor main body and hold the permanent magnets,
- wherein a plurality of rotation prevention protruding parts fitted to the rotation prevention recessed parts of the rotor main body are formed integrally with the permanent magnet holding member, and
- wherein the connecting parts are formed as a plurality of parts which equally divide the annular parts in the circumferential direction and at a circumferential position that is the same as a circumferential position of the rotation prevention protruding parts.

* * * * *